(12) United States Patent
Bieber et al.

(10) Patent No.: US 10,106,708 B2
(45) Date of Patent: *Oct. 23, 2018

(54) RUBBER-BASED PRESSURE SENSITIVE ADHESIVE FOAM

(71) Applicant: 3M INNOVATIVE PROPERTIES COMPANY, St. Paul, MN (US)

(72) Inventors: Pierre Reinhard Bieber, Duesseldorf (DE); Petra M. Stegmaier, Duesseldorf (DE); Siegfried R. Goeb, Willich (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/905,524

(22) PCT Filed: Jul. 29, 2014

(86) PCT No.: PCT/US2014/048621
§ 371 (c)(1),
(2) Date: Jan. 15, 2016

(87) PCT Pub. No.: WO2015/017414
PCT Pub. Date: Feb. 5, 2015

(65) Prior Publication Data
US 2016/0152871 A1 Jun. 2, 2016

(30) Foreign Application Priority Data

Aug. 1, 2013 (EP) ..................................... 13178961

(51) Int. Cl.
| | |
|---|---|
| *C09J 9/00* | (2006.01) |
| *C08J 9/00* | (2006.01) |
| *C08J 9/32* | (2006.01) |
| *C09J 123/28* | (2006.01) |
| *C09J 133/14* | (2006.01) |
| *C09J 11/04* | (2006.01) |
| *C09J 11/06* | (2006.01) |
| *C09J 7/10* | (2018.01) |
| *C08L 23/08* | (2006.01) |
| *C08L 23/14* | (2006.01) |
| *C08L 23/28* | (2006.01) |
| *C08L 33/14* | (2006.01) |
| *C08K 5/00* | (2006.01) |
| *C08K 5/11* | (2006.01) |

(52) U.S. Cl.
CPC .............. *C09J 9/00* (2013.01); *C08J 9/0014* (2013.01); *C08J 9/0023* (2013.01); *C08J 9/32* (2013.01); *C08L 23/0815* (2013.01); *C08L 23/142* (2013.01); *C08L 23/283* (2013.01); *C08L 33/14* (2013.01); *C09J 7/10* (2018.01); *C09J 11/04* (2013.01); *C09J 11/06* (2013.01); *C09J 123/283* (2013.01); *C09J 133/14* (2013.01); *C08J 2201/026* (2013.01); *C08J 2203/22* (2013.01); *C08J 2207/02* (2013.01); *C08J 2300/26* (2013.01); *C08J 2315/02* (2013.01); *C08J 2323/28* (2013.01); *C08K 5/0025* (2013.01); *C08K 5/11* (2013.01); *C08L 2203/14* (2013.01); *C09J 2201/606* (2013.01); *C09J 2205/102* (2013.01); *C09J 2205/11* (2013.01); *C09J 2205/31* (2013.01); *C09J 2400/24* (2013.01); *C09J 2421/00* (2013.01)

(58) Field of Classification Search
CPC ..... C09J 9/00; C09J 7/00; C09J 12/283; C09J 133/14; C09J 2201/606; C09J 2205/102; C09J 2205/11; C09J 2205/31; C09J 2400/24; C09J 2421/00; C09J 2205/2205; C08J 9/0014; C08J 9/0023; C08J 9/32; C08J 2203/22; C08J 2207/02; C08J 2300/26; C08J 2203/26; C08J 2315/02; C08J 2203/14; C08J 2201/026; C08K 5/0025; C08K 5/11
See application file for complete search history.

(56) References Cited

U.S. PATENT DOCUMENTS

| | | | |
|---|---|---|---|
| 4,415,615 A | 11/1983 | Esmay | |
| 5,393,373 A | 2/1995 | Jun | |
| 5,539,033 A | 7/1996 | Bredahl | |
| 5,914,157 A | 6/1999 | Munson | |
| 6,169,138 B1 * | 1/2001 | Petit et al. ................. | C08J 9/32 428/325 |
| 7,910,163 B2 | 3/2011 | Zollner | |
| 7,935,383 B2 | 5/2011 | Zollner | |

(Continued)

FOREIGN PATENT DOCUMENTS

| | | |
|---|---|---|
| DE | 202009013255 | 2/2010 |
| DE | 102008056980 | 5/2010 |

(Continued)

OTHER PUBLICATIONS

Hill, "High energy radiation effects on halogenated butyl rubbers", Polymer, 1995, vol. 36, No. 22, pp. 4185-4192.

(Continued)

*Primary Examiner* — Nathan M Nutter
(74) *Attorney, Agent, or Firm* — Jean A. Lown

(57) ABSTRACT

The present disclosure relates to a pressure sensitive adhesive foam comprising a rubber-based elastomeric material, at least one hydrocarbon tackifier and a crosslinking additive selected from the group of multifunctional (meth)acrylate compounds. The present disclosure also relates to a method of manufacturing such a pressure sensitive adhesive foam and uses thereof.

9 Claims, No Drawings

(56) References Cited

U.S. PATENT DOCUMENTS

| | | |
|---|---|---|
| 8,449,962 B2 | 5/2013 | Prenzel |
| 8,530,578 B2 | 9/2013 | Bharti |
| 8,629,209 B2 | 1/2014 | Lee |
| 8,673,995 B2 | 3/2014 | Chatterjee |
| 8,802,777 B2 | 8/2014 | Zollner |
| 8,962,767 B2 | 2/2015 | Clapper |
| 8,992,720 B2 | 3/2015 | Bharti |
| 2004/0082700 A1 | 4/2004 | Khandpur |
| 2006/0234047 A1* | 10/2006 | Wenninger et al. ...... C09J 7/0214 428/355 R |
| 2009/0053447 A1 | 2/2009 | Zollner |
| 2010/0137524 A1 | 6/2010 | Grittner |
| 2011/0120615 A1* | 5/2011 | Zmarsly et al. ....... C09J 153/02 156/60 |
| 2011/0165402 A1 | 7/2011 | Zollner |
| 2011/0274843 A1 | 11/2011 | Grittner |
| 2011/0281964 A1 | 11/2011 | Zmarsly |
| 2012/0029105 A1 | 2/2012 | Czerwonatis |
| 2012/0128966 A1 | 5/2012 | Ma |
| 2012/0208013 A1 | 8/2012 | Clapper |
| 2012/0322910 A1 | 12/2012 | Chatterjee |
| 2015/0072143 A1 | 3/2015 | Lee |
| 2016/0145406 A1* | 5/2016 | Bieber et al. .......... C08J 9/0061 521/91 |
| 2017/0260350 A1* | 9/2017 | Bieber et al. .......... C08J 9/0061 |

FOREIGN PATENT DOCUMENTS

| | | |
|---|---|---|
| EP | 0752435 | 1/1997 |
| EP | 2094801 | 9/2009 |
| JP | 2000-073025 | 3/2000 |
| JP | 2000073026 | 3/2000 |
| JP | 2011-218647 | 11/2011 |
| JP | 5194916 | 5/2013 |
| WO | WO 2001/44400 | 6/2001 |
| WO | WO 2002/34859 | 5/2002 |
| WO | WO 2003/011954 | 2/2003 |
| WO | WO 2009/029476 | 3/2009 |
| WO | WO 2009/133175 | 11/2009 |
| WO | WO 2009/144305 | 12/2009 |
| WO | WO 2010/033419 | 3/2010 |
| WO | WO 2011/094385 | 8/2011 |
| WO | WO 2011/142964 | 11/2011 |
| WO | WO 2013/096068 | 6/2013 |
| WO | WO 2015/017400 | 2/2015 |

OTHER PUBLICATIONS

Extended European Search Report for EP Application No. EP13178961, date of completion of the search, Jan. 15, 2014, 4 pages.
International Search Report for PCT International Application No. PCT/US2015/048621, dated Oct. 30, 2014, 3 pages.

* cited by examiner

RUBBER-BASED PRESSURE SENSITIVE ADHESIVE FOAM

CROSS REFERENCE TO RELATED APPLICATIONS

This application is a national stage filing under 35 U.S.C. 371 of PCT/US2014/048621, filed Jul. 29, 2014, which claims priority to EP Application No. 13178961.2, filed Aug. 1, 2013, the disclosure of which is incorporated by reference in its/their entirety herein.

TECHNICAL FIELD

The present disclosure relates generally to the field of pressure sensitive adhesive (PSA) foams, more specifically to the field of rubber-based pressure sensitive adhesive foams and rubber-based pressure sensitive adhesive assemblies. The present disclosure also relates to a method of manufacturing such pressure sensitive adhesive foams and assemblies and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives. Pressure sensitive adhesives (PSAs) are well known to one of ordinary skill in the art to possess certain properties including the following: (1) aggressive and permanent tack, (2) adherence with no more than finger pressure, (3) sufficient ability to hold onto an adherend, and (4) sufficient cohesive strength.

Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are various (meth)acrylate based copolymers, natural rubber, synthetic rubbers, and silicones.

Pressure sensitive adhesive foams, in particular, are used as attachment devices for a wide variety of assembly and manufacturing applications, such as interior or exterior automotive mounting of panels and moldings. In a variety of such applications, adhesion to rough or irregular surfaces is desired or necessitated. Under these circumstances, thicker conformable pressure sensitive adhesive foams generally outperform thin pressure sensitive adhesives (such as those less than 125 microns thick). However, as applications for pressure-sensitive adhesives have increased substantially in recent years, performance requirements have become increasingly demanding. In particular, many applications require pressure sensitive adhesives to support a load at elevated temperatures, typically in the range of from 70° C. to 90° C., for which high cohesive strength systems are required.

While the use of crosslinking post-processing step, in particular chemical crosslinking, is generally recognized to provide improved mechanical properties to adhesive compositions, it also recognized that in some circumstances, the use of a crosslinking step may also detrimentally affect tackiness and adhesions characteristics of the resulting adhesive compositions and significantly compromise the ability of an adhesive composition to develop or maintain acceptable pressure sensitive adhesive properties. WO 02/34859-A1 for example describes a process for preparing hot melt adhesive compositions which obviates the need for a crosslinking post-processing step.

Moreover, the pressure sensitive adhesive materials known in the art do not often provide sufficient tack to various types of substrates, in particular the so-called LSE and MSE substrates, i.e. substrates having respectively a low surface energy and a medium surface energy. In particular, the peel force or shear resistance on these challenging-to-bond substrates do not often fulfill the requirements, especially under environmental stress like altering temperatures and humidity.

In addition to increasing performance requirements with regard to pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of, low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful.

Without contesting the technical advantages associated with the pressure sensitive adhesives known in the art, there is still a need for a stable and cost-effective pressure sensitive adhesive foam providing excellent and versatile adhesion characteristics, in particular with respect to peel forces and static shear resistance both at room temperature and high temperature (e.g. 70° C.). Other advantages of the pressure sensitive adhesive (PSA) foams, assemblies and methods of the disclosure will be apparent from the following description.

SUMMARY

According to one aspect, the present disclosure relates to a pressure sensitive adhesive foam comprising a rubber-based elastomeric material, at least one hydrocarbon tackifier and a crosslinking additive selected from the group of multifunctional (meth)acrylate compounds.

In another aspect, the present disclosure is directed to a method of manufacturing a pressure sensitive adhesive foam as described above, which comprises the steps of:
  a) compounding a rubber-based elastomeric material; at least one hydrocarbon tackifier; a crosslinking additive selected from the group of multifunctional (meth)acrylate compounds; optionally, a filler material preferably selected from the group consisting of expandable microspheres, glassbubbles, gaseous cavities, and any combinations or mixtures thereof; optionally, at least one plasticizer, in particular a polyisobutylene plasticizer; thereby forming a pressure sensitive adhesive foam formulation; and
  b) optionally, crosslinking the pressure sensitive adhesive foam formulation, preferably with actinic radiation, more preferably with e-beam irradiation.

According to still another aspect, the present disclosure relates to the use of a pressure sensitive adhesive foam or a pressure sensitive adhesive assembly as described above for industrial applications, in particular for interior applications, more in particular for construction market applications, automotive applications or electronic applications.

DETAILED DESCRIPTION

According to a first aspect, the present disclosure relates to a pressure sensitive adhesive foam comprising a rubber-based elastomeric material, at least one hydrocarbon tackifier and a crosslinking additive selected from the group of multifunctional (meth)acrylate compounds.

In the context of the present disclosure, it has been surprisingly found that a pressure sensitive adhesive foam comprising a rubber-based elastomeric material, at least one hydrocarbon tackifier and a crosslinking additive selected from the group of multifunctional (meth)acrylate compounds, provides excellent and versatile adhesion characteristics, in particular with respect to peel forces and static shear resistance both at room temperature and high temperature (e.g. 70° C.). In addition, the pressure sensitive adhesive foams as described herein provide excellent overall balance of adhesive and cohesive characteristics, in particular with respect to peel forces and static shear resistance on various common substrates. In some aspects, such advantageous properties may be obtained on substrates such as low surface energy and/or medium surface energy substrates.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

The surface energy is typically determined from contact angle measurements as described, for example, in ASTM D7490-08.

The pressure sensitive adhesive foams according to the disclosure may find a particular use for adhering e.g. automotive body side mouldings, weather strips, road signs, commercial signs, constructions, electrical cabinets, shell moulds, machine parts, junction boxes or backsheet solutions for photovoltaic modules. The multilayer pressure sensitive adhesive assembly according to the disclosure is for example suited for bonding to low energy surfaces such as polyolefin surfaces and to medium energy surfaces such as clear coat surfaces. More particularly, the PSA foams disclosed herein may be advantageously used for bonding to automotive clear coat surfaces.

In some aspects, the pressure sensitive adhesive foams according to the present disclosure are particularly suited for (industrial) interior applications, more in particular for construction market applications, automotive applications or electronic applications. In the context of automotive applications, the pressure sensitive adhesive foams as described herein may find particular use for adhering e.g. automotive body side mouldings, weather strips or rearview mirrors.

In the context of the present disclosure, the term "foam" is meant to designate a material based on a polymer and which material comprises voids, typically in an amount of at least 5% by volume, typically from 10% to 55% by volume or from 10% to 45% by volume. The voids may be obtained by any of the known methods, such as cells formed by gas. Alternatively, the voids may result from the incorporation of hollow fillers, such as hollow polymeric particles, hollow glass microspheres or hollow ceramic microspheres.

In the context of the present disclosure, the expression "rubber-based elastomeric material" is meant to refer to any non-acrylic based elastomeric material. Included among such materials are natural and synthetic rubbers.

Any commonly known rubber-based elastomeric material may be used in the context of the present disclosure. Suitable rubber-based elastomeric materials for use herein may be easily identified those skilled in the art, in the light of the present disclosure.

Non-limiting examples of rubber-based elastomeric material for use herein include natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

According to a particular aspect, the rubber-based elastomeric material for use herein is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

According to a preferred aspect of the pressure sensitive adhesive foam of the present disclosure, the rubber-based elastomeric material for use herein is selected from the group consisting of halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers; styrene-isoprene-styrene block copolymers; styrene-butadiene-styrene block copolymers, and any combinations or mixtures thereof.

According to still another preferred aspect, the rubber-based elastomeric material for use herein is selected from the group consisting of halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers, and any combinations or mixtures thereof.

The pressure sensitive adhesive foam of the present disclosure further comprises at least one hydrocarbon tackifier. Any hydrocarbon tackifiers typically included in conventional pressure-sensitive adhesive foam compositions may be used in the context of the present disclosure. Useful hydrocarbon tackifiers are typically selected to be miscible with the polymerizable material. Suitable hydrocarbon tackifier(s) for use herein may be easily identified by those skilled in the art, in the light of the present disclosure.

Either solid or liquid hydrocarbon tackifiers may be added, although solid hydrocarbon tackifiers are preferred. Solid tackifiers generally have a number average molecular weight (Mw) of 10,000 grams per mole or less and a softening point above about 70° C. Liquid tackifiers are viscous materials that have a softening point of about 0° C. to about 120° C.

Suitable tackifying resins may include terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired, as long as they all fulfill the above-detailed VOC level requirement.

Tackifiers that are hydrocarbon resins can be prepared from various petroleum-based feed stocks. There feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobil Chemical under the trade designation ESCOREZ, and from Newport Industries under the trade designations NURES and H-REZ (Newport Industries). In the context of the present disclosure, suitable hydrocarbon tackifiers for use herein may be advantageously selected among those C5/C9-based hydrocarbon tackifiers commercially available from Exxon Mobil Chemical under the trade designation ESCOREZ.

According to a preferred aspect of the pressure sensitive adhesive foam of the present disclosure, the hydrocarbon tackifier for use herein is selected from the group consisting of aliphatic hydrocarbon resins, cycloaliphatic hydrocarbon resins, aromatic modified aliphatic and cycloaliphatic resins, aromatic resins, hydrogenated hydrocarbon resins, terpene and modified terpene resins, terpene-phenol resins, rosin esters, and any combinations or mixtures thereof.

In an advantageous aspect of the pressure sensitive adhesive foam of the present disclosure, the tackifying resin is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

In another advantageous aspect of the pressure sensitive adhesive foam of the present disclosure, the hydrocarbon tackifier comprises a mixture of a hydrocarbon tackifier which is liquid at room temperature and a hydrocarbon tackifier which is solid at room temperature.

Any of the hydrocarbon tackifiers may be used for example in amounts of up to 60 wt %, based on the weight of the pressure sensitive adhesive foam. In some aspects, the tackifiers can be used in amounts up to 55 wt %, up to 50 wt %, or up to 55 wt %, based on the weight of the pressure sensitive adhesive foam. The amount of tackifier can be for example, in the range of from 5 wt % to 60 wt %, from 5 wt % to 50 wt %, from 10 wt % to 45 wt %, or even from 15 wt % to 45 wt %, based on the weight of the pressure sensitive adhesive foam.

The pressure sensitive adhesive foam of the present disclosure further comprises a crosslinking additive (also referred to as crosslinking agent) selected from the group of multifunctional (meth)acrylate compounds. Any multifunctional (meth)acrylate compounds typically included in conventional pressure-sensitive adhesive foam compositions, and useful as crosslinking additive, may be used in the context of the present disclosure. Suitable multifunctional (meth)acrylate compounds for use herein may be easily identified by those skilled in the art in the light of the present disclosure.

Suitable crosslinking additives for use herein may have multiple (meth)acryloyl groups. Crosslinkers with multiple (meth)acryloyl groups can be di(meth)acrylates, tri(meth) acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In many aspects, the crosslinkers contain at least two (meth)acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, Ga. and under the trade designation SR-351 from Sartomer, Exton, Pa.), trimethylolpropane trimethacrylate (e.g., commercially available under the trade designation SR-350 from Sartomer, Exton, Pa.), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth) acryloyl groups includes, but is not limited to, dipentaerythritol pentaacrylate (e.g., commercially available under the trade designation SR-399 from Sartomer).

In some aspects, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

The crosslinking additive, may be used for example in amounts of up to 40 wt %, based on the weight of the pressure sensitive adhesive foam. In some aspects, the crosslinking additive may be used in amounts up to 20 wt %, up to 15 wt %, up to 10 wt %, or up to 5 wt %, based on the weight of the pressure sensitive adhesive foam. The amount of crosslinking additive can be for example, in the range of from 0.1 wt % to 10 wt %, from 0.5 wt % to 8 wt %, from 1 wt % to 6 wt %, or even from 2 wt % to 5 wt %, based on the weight of the pressure sensitive adhesive foam.

In a preferred aspect of the present disclosure, the crosslinking additive for use herein is activated/activable with actinic radiation, more preferably with e-beam irradiation. Alternatively, the crosslinking additive for use herein may be activated using UV or high energy electromagnetic radiation, such as gamma or e-beam radiation.

In a more preferred aspect, the crosslinking additive is selected from the group of multifunctional (meth)acrylate compounds. Exemplary multifunctional (meth)acrylate compounds preferably comprise at least two (meth)acryloyl groups, in particular three or four (meth)acryloyl groups, more in particular three (meth)acryloyl groups.

In an advantageous aspect, the multifunctional (meth) acrylate compound has the following Formula:

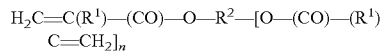

wherein $R^1$ is hydrogen or methyl; n is 1, 2, 3 or 4; and $R^2$ is an alkylene, arylene, heteroalkylene, or any combinations thereof.

According to a very advantageous aspect, the crosslinking additive for use herein is a multifunctional (meth)acrylate compound selected from the group consisting of 1,6-hexanediol di(meth)acrylate, trimethylolpropane tri(meth)acrylate, and any combinations or mixtures thereof.

The pressure sensitive adhesive foam of the present disclosure may further comprise, as an optional ingredient, a plasticizer. Any plasticizers typically included in conventional pressure-sensitive adhesive foam compositions may be used in the context of the present disclosure. Useful plasticizers are typically selected to be miscible with the polymerizable material, and the tackifier. Suitable plasticizers for use herein may be easily identified by those skilled in the art, in the light of the present disclosure.

Suitable plasticizers include, but are not limited to, polyisobutylenes, mineral oils, ethylene propylene diene monomer rubbers, liquid hydrocarbon resins, various polyalkylene oxides (e.g., polyethylene oxides or propylene oxides), adipic acid esters, formic acid esters, phosphoric acid esters, benzoic acid esters, phthalic acid esters, sulfonamides, naphthenic oils, and any combinations or mixtures thereof.

According to a particular aspect of the pressure sensitive adhesive foam according to the present disclosure, the plasticizer is selected from the group consisting of polyisobutylenes, mineral oils, ethylene propylene diene monomer rubbers, liquid hydrocarbon resins, and any combinations or mixtures thereof. Preferably, the plasticizer is selected from the group of polyisobutylene plasticizers.

In the context of the present disclosure, suitable polyisobutylene plasticizers for use herein may be advantageously selected among those commercially available from BASF under the trade designation OPPANOL.

The plasticizers, if present, may be used for example in amounts of up to 40 wt %, based on the weight of the pressure sensitive adhesive foam. In some aspects, the plasticizers may be used in amounts up to 35 wt %, up to 30 wt %, or up to 25 wt %, based on the weight of the pressure sensitive adhesive foam. The amount of plasticizers can be for example, in the range of from 1 wt % to 40 wt %, from 2 wt % to 30 wt %, or even from 5 wt % to 30 wt %, or even from 10 wt % to 25 wt %, based on the weight of the pressure sensitive adhesive foam.

In some aspects, the pressure sensitive adhesive foam of the present disclosure may further comprise, as an optional ingredient, a (further) filler material. Such fillers may be advantageously used to e.g. increase the mechanical stability of the pressure sensitive adhesive assembly and may also increase its shear and peel force resistance.

Any filler material commonly known to those skilled in the art may be used in the context of the present disclosure. Typical examples of filler material that can be used herein include, but are not limited to, those selected from the group consisting of expanded perlite, microspheres, expandable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a preferred aspect of the present disclosure, the pressure sensitive adhesive foam further comprises at least one filler material which is selected from the group consisting of microspheres, expandable microspheres, preferably pentane filled expandable microspheres, gaseous cavities, glass beads, glass microspheres, glass bubbles and any combinations or mixtures thereof. More preferably, the at least one filler material for use herein is selected from the group consisting of expandable microspheres, glass bubbles, and any combinations or mixtures thereof.

As will be apparent to those skilled in the art, in the light of the present disclosure, other additives may optionally be included in the pressure sensitive adhesive foam to achieve any desired properties. Such additives include, but are not limited to, further tackifiers, further crosslinking additives, pigments, toughening agents, reinforcing agents, fire retardants, antioxidants, and various stabilizers. The additives are typically added in amounts sufficient to obtain the desired end properties.

According to one particular aspect, the pressure sensitive adhesive foam according to the present disclosure comprises:
  a) from 20 wt % to 80 wt %, from 30 wt % to 70 wt %, or even from 40 wt % to 60 wt % of the rubber-based elastomeric material, based on the weight of the pressure sensitive adhesive foam;
  b) from 5 wt % to 60 wt %, from 5 wt % to 50 wt %, from 10 wt % to 45 wt %, or even from 15 wt % to 45 wt % of the hydrocarbon tackifier(s), based on the weight of the pressure sensitive adhesive foam;
  c) from 0.1 wt % to 10 wt %, from 0.5 wt % to 8 wt %, from 1 wt % to 6 wt %, or even from 2 wt % to 5 wt % of a crosslinking additive, based on the weight of the pressure sensitive adhesive foam, and wherein the crosslinking additive is selected from the group of multifunctional (meth)acrylate compounds;
  d) optionally, from 1 wt % to 40 wt %, from 2 wt % to 30 wt %, from 5 wt % to 30 wt %, or even from 10 wt % to 25 wt % of the polyisobutylene plasticizer(s), based on the weight of the pressure sensitive adhesive foam; and
  e) optionally, from 2 wt % to 30 wt %, from 2 wt % to 20 wt %, or even from 2 wt % to 15 wt % of filler material preferably selected from the group of expandable microspheres and glass bubbles, based on the weight of the pressure sensitive adhesive foam;
  f) optionally, from 0.05 wt % to 2 wt % of stabilizers selected of the group consisting of thermal stabilizers, UV stabilizers and process stabilizers, based on the weight of the pressure sensitive adhesive foam; and
  g) optionally, from 0.1 wt % to 5 wt % of filler additives preferably selected from the group consisting of carbon black, aerosil and silicates, based on the weight of the pressure sensitive adhesive foam.

In particularly advantageous aspect, the pressure sensitive adhesive foam according to the present disclosure is crosslinked, preferably with actinic radiation, more preferably with e-beam irradiation.

In the context of the present disclosure, it has been surprisingly found that crosslinking the pressure sensitive adhesive foam formulation as described above, in particular with actinic radiation, and preferably with e-beam irradiation, provides a pressure sensitive adhesive foam characterized with further enhanced static shear performance both at room temperature and high temperature (e.g. 70° C.).

While performing e-beam irradiation based crosslinking, finding suitable e-beam irradiation dose in conjunction with selecting suitable e-beam acceleration tension will be well within the practice of those skilled in the art. Suitable acceleration tensions are typically selected and adapted to the coating weight of the corresponding pressure sensitive adhesive foam formulation layer. Exemplary e-beam acceleration tensions are typically comprised between 140 and 300 kV for foam layers with a coating weight between 200 and 1200 g/m$^2$.

Advantageously, the pressure sensitive adhesive foams of the present disclosure may be crosslinked using an e-beam irradiation dose of less than 150 kGy, less than 130 kGy, less than 100 kGy, less than 80 kGy, less than 50 kGy, or even less than 30 kGy. Typically, the suitable e-beam irradiation dose is of at least 5 kGy, at least 10 kGy, or even at least 20 kGy.

In a particular aspect of the pressure sensitive adhesive foam according to the present disclosure, the hydrocarbon tackifier(s) and/or the plasticizer(s), in particular the polyisobutylene plasticizer(s), have a Volatile Organic Compound (VOC) value of less than 1000 ppm, less than 800 ppm, less than 600 ppm, less than 400 ppm or even less than 200 ppm, when measured by thermogravimetric analysis according to the weight loss test method described in the experimental section.

In the context of the present disclosure, it has been surprisingly found that a pressure sensitive adhesive foam comprising a rubber-based elastomeric material, at least one hydrocarbon tackifier and optionally at least one plasticizer, for example a polyisobutylene plasticizer, wherein the hydrocarbon tackifier(s) and/or the plasticizer(s) have a Volatile Organic Compound (VOC) value of less than 1000 ppm, when measured by thermogravimetric analysis according to the weight loss test method described in the experimental section, provide excellent characteristics and performance as to overall VOC levels reduction.

Advantageously, the hydrocarbon tackifier(s) and/or the plasticizer(s), in particular the polyisobutylene plasticizer(s) for use herein, have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

In the context of the present disclosure, it has been surprisingly found that a pressure sensitive adhesive foam comprising a rubber-based elastomeric material, at least one hydrocarbon tackifier and optionally at least one plasticizer, for example a polyisobutylene plasticizer, wherein the hydrocarbon tackifier(s) and/or the plasticizer(s) have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section, provide excellent characteristics and performance as to resistance of outgassed components to condensation and/or thermal stability of the corresponding pressure sensitive adhesive foam. Pressure sensitive adhesive foams provided with advantageous low fogging characteristics are particularly suited for electronic applications.

Advantageously still, the hydrocarbon tackifier(s) and/or the plasticizer(s), in particular the polyisobutylene plasticizer(s) for use herein, have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

In the context of the present disclosure, it has been surprisingly found that a pressure sensitive adhesive foam comprising a rubber-based elastomeric material, at least one hydrocarbon tackifier and optionally at least one plasticizer, for example a polyisobutylene plasticizer, wherein the hydrocarbon tackifier(s) and/or the plasticizer(s) have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section, provide excellent thermal stability.

According to another aspect, the present disclosure is directed to a pressure sensitive adhesive assembly comprising a pressure sensitive adhesive foam as described above. The pressure sensitive adhesive assembly according to the present disclosure may have a design or configuration of any suitable kind, depending on its ultimate application and the desired properties, and provided it comprises at least a pressure sensitive adhesive foam as described above.

The pressure sensitive adhesive assembly of the present disclosure may take the form of a single layer construction, and consist essentially of a pressure sensitive adhesive foam layer. Such a single layer assembly can be advantageously used as double-sided adhesive tape.

According to an alternative aspect, the pressure sensitive adhesive assembly of the present disclosure may take the form of a multilayer construction, and may comprise e.g. two or more superimposed layers, i.e. the first pressure sensitive adhesive layer and adjacent layers such as e.g. a backing layer and/or further pressure sensitive adhesive layers. Such adhesive multilayer constructions or tapes may be advantageously used as a dual-layer adhesive tape to adhere two objects to one another. In that context, suitable backing layers for use herein may or may not exhibit at least partial pressure sensitive adhesive characteristics.

In executions where a backing layer is also present, such a pressure sensitive adhesive assembly reflects a three-layer design, in which the backing layer may be sandwiched between e.g. two pressure sensitive adhesive layers.

Regarding multilayer pressure sensitive adhesive assemblies, the present disclosure is not limited to the above described designs. As a further alternative execution, the pressure sensitive adhesive assembly may comprise at least one intermediate layer between a backing layer and pressure sensitive adhesive layer(s). These further internal intermediate layers, as well as the backing layer, may exhibit advantageous mechanical properties, such as e.g. increasing the tear resistance of the multilayer pressure sensitive adhesive assembly or optical functionalities such as e.g. light transmission or reflection, colouring and labeling.

In a particular aspect, the intermediate layer comprises a polymer chosen from the group consisting of polyacrylates, polyurethanes, polyolefins, polystyrene, polyamides, natural rubbers, synthetic rubbers, polyvinylpyrrolidone, and any combinations or mixtures thereof.

However, it is also possible that the intermediate layer(s) is chosen from a pressure sensitive adhesive composition as described in this disclosure for the PSA layer. The formulation of the intermediate layer(s) may be identical or different compared to the pressure sensitive adhesive layer.

Suitable backing layers can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like.

According to a particular aspect, the pressure sensitive adhesive assembly according to the present disclosure comprises a pressure sensitive adhesive foam which takes the form of a polymeric foam layer.

In the context of the present disclosure, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods, such as cells formed by gas. Alternatively, the voids may result from the incorporation of hollow fillers, such as hollow polymeric particles, hollow glass microspheres or hollow ceramic microspheres.

A polymeric foam layer for use herein has for example a thickness comprised between 100 and 6000 μm, between 200 and 4000 μm, between 500 and 2000 μm, or even between 800 and 1500 μm. As will be apparent to those skilled in the art, in the light of the present description, the preferred thickness of the polymeric foam layer will be dependent on the intended application.

A polymeric foam layer typically has a density comprised between 0.40 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the polymeric foam layer can be created in any of the known manners described in the art and include the use of a gas or blowing agent and/or including hollow particles into the composition for the polymeric foam layer. For example, according to one method to create an acrylic polymeric foam described in U.S. Pat. No. 4,415,615, an acrylic foam can be obtained by the steps of (i) frothing a composition containing the acrylate monomers and optional comonomers, (ii) coating the froth on a backing and (iii) polymerizing the frothed composition. It is also possible to coat the unfrothed composition of the acrylate monomers and optional comonomers to the backing and to then simultaneously foam and polymerize that composition. Frothing of the composition may be accomplished by whipping a gas into the polymerizable composition. Preferred gasses for this purpose are inert gasses such as nitrogen and carbon dioxide, particularly if the polymerization is photoinitiated.

In a particular aspect, the pressure sensitive adhesive assembly of the present disclosure is in the form of a multilayer pressure sensitive adhesive assembly further comprising a second pressure sensitive adhesive layer adjacent to the pressure sensitive adhesive foam layer.

According to the particular execution, wherein the multilayer pressure sensitive adhesive assembly further comprises a second pressure sensitive adhesive layer adjacent to the pressure sensitive adhesive foam layer, the multilayer pressure sensitive adhesive assembly of the present disclosure may advantageously take the form of skin/core type multilayer pressure sensitive adhesive assembly, wherein the pressure sensitive adhesive foam layer is the core layer of the multilayer pressure sensitive adhesive assembly and the second pressure sensitive adhesive layer is the skin layer of the multilayer pressure sensitive adhesive assembly. This particular execution is commonly referred to as a dual layer polymeric foam tape assembly. Skin/core type of multilayer pressure sensitive adhesive assemblies are well known to those skilled in the art.

Multilayer pressure sensitive adhesive assemblies according to the present disclosure, and in particular dual layer polymeric foam tape assemblies, are particularly advantageous when compared to single-layer pressure sensitive adhesives, in that adhesion (quick adhesion) can be adjusted by the formulation of the second pressure sensitive adhesive layer (also commonly referred to as the skin layer), while other properties/requirements of the overall assembly such as application issues, deforming issues and energy distribution may be addressed by appropriate formulation of the polymeric foam layer (also commonly referred to as the core layer). In some aspects, the multilayer pressure sensitive adhesive assemblies as disclosed herein are smooth, homogenous and consist of layers which are chemically bond to each other, without any delamination occurring, or alternatively physically bond to each other.

In some aspects, it may be advantageous for the multilayer pressure sensitive adhesive assemblies of the present disclosure to further comprise a third pressure sensitive adhesive layer which is preferably adjacent to the pressure sensitive adhesive foam layer in the side of the pressure sensitive adhesive foam layer which is opposed to the side of the pressure sensitive adhesive foam layer adjacent to the second pressure sensitive adhesive layer, and thereby forming a three-layered multilayer pressure sensitive adhesive assembly.

Three-layered multilayer pressure sensitive adhesive assemblies according to one aspect of the disclosure, may advantageously take the form of a skin/core/skin multilayer pressure sensitive adhesive assembly, wherein the pressure sensitive adhesive foam layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

In some particular aspects of the pressure sensitive adhesive assembly according to the disclosure, a primer layer is comprised between the pressure sensitive adhesive foam layer and the second pressure sensitive adhesive layer and/or the third pressure sensitive adhesive layer. In the context of the present disclosure, any primer compositions commonly known to those skilled in the art may be used. Finding appropriate primer compositions is well within the capabilities of those skilled in the art in the light of the present disclosure.

According to an advantageous aspect though, the primer layer is formulated to be crosslinkable, preferably with actinic radiation, more preferably with e-beam irradiation. In the context of the present disclosure, it has been surprisingly discovered that the use of crosslinkable primer compositions, in particular compositions crosslinkable with actinic radiation, preferably with e-beam irradiation, may provide improved primer performance over the commonly known primer compositions.

In some pressure sensitive adhesive assembly executions, it has been indeed found that problems such as e.g. incompatibility between the existing primer compositions and the rubber-based pressure sensitive adhesive foam layer, or premature delamination of the pressure sensitive adhesive assembly, in particular at high temperature (e.g. 70° C.) may occur. This may in particular occur while using acrylate-based primer compositions in combination with the rubber-based pressure sensitive adhesive foam layer and an additional acrylate based pressure sensitive adhesive layer (e.g. first and/or second skin layer).

Without wishing to be bound by theory, it is believed that the improved primer performance achieved by crosslinkable/reactive primer compositions is due to improved adhesion of the primer composition to the pressure sensitive adhesive foam layer, which is believed to be achieved through increased overall crosslinking density in the primer layer.

In particular aspect, the primer layer comprises a crosslinking additive selected from the group of multifunctional (meth)acrylate compounds, wherein the multifunctional (meth)acrylate compound preferably comprises at least two (meth)acryloyl groups, as described above.

Exemplary reactive primer compositions comprise as an halogenated polyolefin compound dissolved in a reactive monomer, in particular a reactive acrylate monomer (such as e.g. isobornyl acrylate IBOA), and compounded with a multifunctional (meth)acrylate compound, in particular a multifunctional (meth)acrylate compound comprising at least two (meth)acryloyl groups.

In some aspects, the pressure sensitive adhesive assembly according to the present disclosure is crosslinked, preferably with actinic radiation, more preferably with e-beam irradiation. According to one preferred aspect, the pressure sensitive adhesive assembly is crosslinked with e-beam irradiation, wherein the e-beam irradiation dose is preferably of less than 150 kGy, less than 130 kGy, less than 100 kGy, less than 80 kGy, less than 50 kGy, or even less than 30 kGy. Typically, the e-beam irradiation dose is of at least 5 kGy, at least 10 kGy, or even at least 20 kGy.

The second pressure sensitive adhesive layer and/or the third pressure sensitive adhesive layer may have any composition commonly known in the art. As such, the composition of these various layers for use in the multilayer pressure sensitive adhesive assemblies of the present disclosure is not particularly limited.

In a particular aspect, the second pressure sensitive adhesive layer and/or the third pressure sensitive adhesive layer comprise a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

In a typical aspect, the second pressure sensitive adhesive layer and/or the third pressure sensitive adhesive layer comprise a polymer base material selected from the group consisting of polyacrylates, polyurethanes, and any combinations, copolymers or mixtures thereof. According to another typical aspect, the second pressure sensitive adhesive layer and/or the third pressure sensitive adhesive layer comprise a polymer base material selected from the group consisting of polyacrylates, and any combinations, copolymers or mixtures thereof.

According to a preferred aspect of the pressure sensitive adhesive assemblies of the present disclosure, the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

As used herein, the term "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A (meth)acrylic-based" material refers to one prepared from one or more monomers having a (meth)acryloyl group, which is a group of formula $CH_2=C(R)-(CO)-$ where R is hydrogen or methyl.

The term "alkyl" refers to a monovalent group which is a saturated hydrocarbon. The alkyl can be linear, branched, cyclic, or combinations thereof and typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl and 2-propylheptyl.

The terms "glass transition temperature" and "Tg" are used interchangeably and refer to the glass transition temperature of a material or a mixture. Unless otherwise indicated, glass transition temperature values are determined by Differential Scanning calorimetry (DSC).

According to a preferred aspect of the pressure sensitive adhesive assemblies of the present disclosure, the second pressure sensitive adhesive layer and/or the third pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In a more preferred aspect, the linear or branched alkyl (meth)acrylate ester for use herein is selected from the group consisting of iso-octyl (meth)acrylate, 2-ethylhexyl (meth) acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate and 2-propylheptyl acrylate.

According to an alternative aspect, the linear or branched alkyl (meth)acrylate ester for use herein is selected to comprise 2-octyl(meth)acrylate. Polymer base material derived from 2-octyl (meth)acrylate provides comparable adhesive properties when compared with other isomers of octyl (meth)acrylate, such as n-octyl and isooctyl. Further, the pressure sensitive adhesive compositions have lower inherent and solution viscosities when compared to adhesive compositions derived from other octyl isomers, such as isooctyl acrylate, at the same concentrations, and under the same polymerization conditions.

The 2-octyl (meth)acrylate may be prepared by conventional techniques from 2-octanol and (meth)acryloyl derivates such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

It is however preferred that the 2-octyl(meth)acrylate monomer for use herein is at least partly, preferably completely (i.e. 100 wt.-%) derived from biological material, more preferably from a plant material. This may advantageously be used to provide adhesive films/tapes which are at least partly derived from "green" sources, which is ecologically more sustainable and also reduces the dependency on mineral oil and the price development.

In the context of the present disclosure, the term "derived from biological material" is meant to express that from a certain chemical ingredient, at least a part of its chemical structure comes from biological materials, preferably at least 50 wt.-% of its structure. This definition is in principle the same as for bio-diesel fuel, in which usually only the fatty acid part originates from biological sources whereas the methanol may also be derived from fossil material like coal or mineral oil.

(Meth)acrylic-based polymeric materials included in known pressure-sensitive adhesives are often prepared from one or more non-polar acrylate monomers with a relatively low glass transition temperature Tg (i.e., the Tg of a monomer is measured as a homopolymer prepared from the monomer) plus various optional monomers such as one or more polar monomers. The polar monomers are often selected to have an acidic group, a hydroxyl group, or a nitrogen-containing group.

Some widely used non-polar acrylate monomers in conventional (meth)acrylic-based elastomeric materials are alkyl (meth)acrylates such as 2-ethylhexyl acrylate (2-EHA) and isooctyl acrylate (IOA).

According to a particular aspect of the pressure sensitive adhesive assemblies of the present disclosure, the second pressure sensitive adhesive layer and/or the third pressure sensitive adhesive layer (common referred to as skin layers), comprises a polymer base material further comprising a polar comonomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof. Other useful polar comonomers include, but are not limited to, N-substituted acrylamides, acrylonitrile, methacrylonitrile, hydroxyalkyl acrylates, cyanoethyl acrylate, maleic anhydride, N-vinyl-2-pyrrolidone, N-vinyl-caprolactam and any combinations or mixtures thereof.

According to a typical aspect of the present disclosure, the second pressure sensitive adhesive layer and/or the third pressure sensitive adhesive layer for use in the pressure sensitive adhesive assembly comprises a pressure sensitive adhesive composition comprising a reaction product of a polymerizable material comprising:

(a) a linear or branched alkyl (meth)acrylate ester as main monomer, wherein the main monomer is preferably selected from the group consisting of iso-octyl (meth)

acrylate, 2-ethylhexyl (meth)acrylate, 2-propylheptyl (meth)acrylate, butyl acrylate; and optionally (b) a second monomer having an ethylenically unsaturated group, preferably a reinforcing monoethylenically-unsaturated monomers which is copolymerizable with the acrylate main monomer.

In some exemplary aspects, the polymerizable material used for producing the second pressure sensitive adhesive layer and/or the third pressure sensitive adhesive layer of the pressure sensitive adhesive assembly comprises (at least one) second monomer having an ethylenically unsaturated group. Any suitable second monomer having an ethylenically unsaturated group may be used to prepare the polymerizable material used for producing the second pressure sensitive adhesive layer and/or the third pressure sensitive adhesive layer of the PSA assembly. Suitable second monomer having an ethylenically unsaturated group for use herein will be easily identified by those skilled in the art, in the light of the present description.

According to an advantageous aspect of the pressure sensitive assembly of the present disclosure, the polymerizable material used to produce the second pressure sensitive adhesive layer and/or the third pressure sensitive layer, comprises:

a) from 50 to 99.5 weight percent, or from 60 to 90 weight percent, of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a polar monomer, preferably a polar acrylate; and optionally d) a tackifying resin, wherein the weight percentages are based on the total weight of polymerizable material.

According to still another advantageous aspect of the pressure sensitive assembly, the polymerizable material used to produce the second pressure sensitive adhesive layer and/or the third pressure sensitive layer, comprises:

a) of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer, preferably a polar acrylate; optionally d) a second polar monomer, preferably a polar non-acrylate monomer; and optionally e) a tackifying resin;

wherein the weight percentages are based on the total weight of polymerizable material.

According to still another advantageous aspect of the PSA assembly, the particular pressure-sensitive adhesive composition (i.e. polymerizable material) used to produce the second pressure sensitive adhesive layer and/or the third pressure sensitive adhesive layer further comprises a tackifying resin, typically in an amount from 3 to 50 parts, from 5 to 30 parts, or even from 8 to 25 parts, per 100 parts of the polymerizable material. Tackifying resins useful in producing the second pressure sensitive adhesive layer and/or the third pressure sensitive adhesive layer, are as described above in the context of the pressure sensitive adhesive foam.

According to one particular aspect of the pressure sensitive adhesive assembly according to the present disclosure, the polymerizable material used to produce the second pressure sensitive adhesive layer and/or the third pressure sensitive adhesive layer may further comprise a crosslinker, preferably in an amount of up to 5 weight percent, based on the total weight of polymerizable material. Suitable crosslinking additives for producing the second pressure sensitive adhesive layer and/or the third pressure sensitive adhesive layer, are as described above in the context of the pressure sensitive adhesive foam.

An initiator for free radical polymerization is typically added to the various monomers used to form the polymerizable material. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material.

In some executions, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many executions, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1, 2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The particular polymerizable material used to produce the second pressure sensitive adhesive layer and/or the third pressure sensitive adhesive layer may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

According to one particular aspect of the pressure sensitive adhesive assembly according to the present disclosure, the particular polymerizable material used to produce the second pressure sensitive adhesive layer and/or the third pressure sensitive adhesive layer may further include one or more other vinyl monomers such as vinyl esters (e.g., vinyl acetate and vinyl propionate); styrene or derivatives thereof such as alkyl substituted styrene (e.g., α-methyl styrene); vinyl halide; or mixtures thereof. These monomers can be polar or non-polar. If present, these other vinyl monomer can be present in any suitable amount. In some aspects, the vinyl monomers are present in an amount of up 5 parts by weight, based on a total weight of polymerizable material. For example, the vinyl monomer can be used in amounts up to 4 weight percent, up to 3 weight percent, or up to 2 weight percent. In some particular aspects, the vinyl monomer is present in an amount in a range of 0 to 5 weight percent, 0.5 to 5 weight percent, 1 to 5 weight percent, 0 to 3 weight percent, or 1 to 3 weight percent.

The polymerizable material used to form the pressure sensitive adhesive layer(s) of the PSA assembly may include an organic solvent or may be free or essentially free of an organic solvent. As used herein, the term "essentially free" in reference to an organic solvent means that the means that the organic solvent is present in an amount less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, ethylene glycol alkyl ether, and any combinations or mixtures thereof.

The particular pressure-sensitive adhesive compositions may be prepared by a variety of conventional free radical polymerization methods, including solution, bulk (i.e., with little or no solvent), dispersion, emulsion, and suspension processes. The particular method used may be influenced by the use of the final pressure sensitive adhesive composition. The reaction product of the polymerizable materials can be random or block copolymers.

In some methods of preparing the pressure sensitive adhesive composition(s) for the pressure sensitive adhesive layer(s) of the PSA assembly according to the disclosure, the polymerizable material containing the monomers is partially polymerized so as to increase its viscosity to that corresponding to a syrup-like material. Generally, the main monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group). Then, the crosslinker and any remaining portion of the initiator may be added to the syrup-like, partially polymerized material. Optional tackifiers and plasticizers may also be combined with the partially polymerized material. The resulting mixture can be more readily applied as a coating composition onto a support (e.g., release liner) or another layer (e.g., polymeric foam layer). The coating layer can then be exposed to actinic radiation if a photoinitator is present or to heat if a thermal initiator is present. Exposure to actinic radiation or heat typically results in the further reaction of polymerizable material within the coating composition.

To be useful as a pressure sensitive adhesive, the pressure sensitive adhesive material typically has a storage modulus less than 300,000 Pascals at 25° C. The storage modulus of the pressure-sensitive adhesive material usually is no greater than 200,000 Pascals, no greater than 100,000 Pascals, no greater than 50,000 Pascals, or no greater than 25,000 Pascal at 25° C. For example, the storage modulus can be no greater than 10,000 Pascals, no greater than 9,000 Pascals, no greater than 8,000 Pascals, or no greater than 7,500 Pascals at 25° C. A lower storage modulus is often desirable for high performance pressure-sensitive adhesives.

In a particular aspect of the pressure-sensitive adhesive assembly according to the present disclosure, the second pressure sensitive adhesive layer and/or the third pressure sensitive adhesive layer comprise a filler material. Suitable filler material for producing the second pressure sensitive adhesive layer and/or the third pressure sensitive adhesive layer, are as described above in the context of the pressure sensitive adhesive foam.

As will be apparent to those skilled in the art in the light of the present disclosure, other additives may optionally be included in any layer of the pressure sensitive adhesive assembly to achieve any desired properties. Such additives, include pigments, tackifiers, toughening agents, reinforcing agents, fire retardants, antioxidants, and various stabilizers. The additives are added in amounts sufficient to obtain the desired end properties.

According to a typical execution, the pressure sensitive adhesive assembly according to the present disclosure is further provided on at least one of its major surfaces with a release liner. As release liner, any suitable material known to the skilled person can be used, such as e.g. a siliconized paper or siliconized polymeric film material, in particular a siliconized PET-film or a siliconized PE or PE/PP blend film material.

The thickness of the various pressure sensitive adhesive layer(s) and other optional layer(s) comprised in the pressure sensitive adhesive assembly may vary in wide ranges depending on the desired execution and associated properties. By way of example, the thickness can be independently chosen for each layer between 25 μm and 6000 μm, between 40 µm and 3000 µm, between 50 µm and 3000 µm, between 75 µm and 2000 µm, or even between 75 µm and 1500 µm.

According to the particular execution, wherein the multilayer pressure sensitive adhesive assembly takes the form of skin/core type multilayer pressure sensitive adhesive assembly, wherein the pressure sensitive adhesive foam layer is the core layer of the multilayer pressure sensitive adhesive assembly and the second pressure sensitive adhesive layer is the skin layer of the multilayer pressure sensitive adhesive assembly, it is preferred that the second pressure sensitive adhesive layer has a lower thickness compared to the first pressure sensitive adhesive layer. This is particularly advantageous in executions where the pressure sensitive adhesive foam layer is a polymeric foam layer, thereby forming a polymeric foam pressure sensitive adhesive tape. As a way of example, the thickness of the second pressure sensitive adhesive layer may typically be in the range from 20 µm to 250 µm, or even from 40 µm to 200 µm, whereas the thickness of the polymeric foam layer may typically be in the range from 100 µm to 6000 µm, from 400 µm to 3000 µm, or even from 800 µm to 2000 µm. Such multilayer pressure sensitive adhesive assemblies typically exhibit high peel adhesion. Without wishing to be bound by theory, it is believed such high peel adhesion is caused by a stabilizing effect of the relatively thick polymeric foam layer compared to the first PSA layer.

According to an advantageous aspect, the pressure sensitive adhesive foam as described above or the pressure sensitive adhesive assembly as described above, has a static shear strength value of more than 2000 min, more than 4000 min, more than 6000 min, more than 8000 min, or even more than 10000 min, when measured at 70° C. according to the static shear test method described in the experimental section.

According to a particularly advantageous aspect, the pressure sensitive adhesive foam as described above or the pressure sensitive adhesive assembly as described above, has a Volatile Organic Compound (VOC) value of less than 2000 ppm, less than 1500 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

Advantageously still, the pressure sensitive adhesive foam as described above or the pressure sensitive adhesive assembly as described above, has a Volatile Organic Compound (VOC) value of less than 2000 ppm, less than 1500 ppm, less than 1000 ppm, less than 800 ppm, less than 600 ppm, less than 500 ppm, less than 400 ppm, or even less than 300 ppm, when measured by thermal desorption analysis according to test method VDA278.

Advantageously still, the pressure sensitive adhesive foam as described above or the pressure sensitive adhesive assembly as described above, has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermogravimetric analysis according to the weight loss test method described in the experimental section.

Advantageously still, the pressure sensitive adhesive foam as described above or the pressure sensitive adhesive assembly as described above, has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

The present disclosure is further directed to a method of manufacturing a pressure sensitive adhesive foam as described above, which comprises the steps of:
a) compounding a rubber-based elastomeric material; at least one hydrocarbon tackifier; a crosslinking additive selected from the group of multifunctional (meth)acrylate compounds; optionally, a filler material preferably selected from the group consisting of expandable microspheres, glassbubbles, gaseous cavities, and any combinations or mixtures thereof; optionally, at least one plasticizer, in particular a polyisobutylene plasticizer; thereby forming a pressure sensitive adhesive foam formulation; and
b) optionally, crosslinking the pressure sensitive adhesive foam formulation, preferably with actinic radiation, more preferably with e-beam irradiation.

In a particular aspect, the method of manufacturing a pressure sensitive adhesive foam according to the present disclosure, is a solvent-free method. By solvent-free method, it is herein meant to reflect that there is substantially no added solvent during the processing steps of the method of manufacturing the pressure sensitive adhesive foam.

In a more particular aspect, the method of manufacturing a pressure sensitive adhesive foam comprises a hotmelt processing step, more preferably a hotmelt extrusion processing step, in particular a twin screw hotmelt extrusion processing step.

According to a particular aspect of this method of manufacturing a pressure sensitive adhesive assembly, a liquid precursor of the pressure sensitive adhesive foam layer is deposited on a substrate and then cured, preferably with actinic radiation, e-beam radiation or by thermal curing.

According to another exemplary aspect of this method, the pressure sensitive adhesive foam layer and a second pressure sensitive adhesive layer and/or a third pressure sensitive adhesive layer are prepared separately and subsequently laminated to each other.

According to an alternative exemplary aspect of this method, a liquid precursor of a second pressure sensitive adhesive layer and/or a third pressure sensitive adhesive layer is superimposed on the liquid precursor of the pressure sensitive adhesive foam layer before curing, in particular with actinic radiation such as UV, γ (gamma) or e-beam radiation or by thermal curing. This method is described in full details in WO 2011094385(A1), the content of which is herewith incorporated by reference.

However, the production of the pressure sensitive adhesive assembly is not limited to the before mentioned methods. For instance, the pressure sensitive adhesive assembly may be produced by co-extrusion, solvent-based methods or also combinations thereof.

The pressure sensitive adhesive assembly of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The pressure sensitive adhesive assemblies of the present disclosure may be used in any article conventionally known to use such assemblies such as labels, tapes, signs, covers, marking indices, display components, touch panels, and the like. Flexible backing materials having microreplicated surfaces are also contemplated.

The pressure sensitive adhesive assembly may be coated/applied on a substrate using any conventional coating techniques modified as appropriate to the particular substrate. For example, pressure sensitive adhesive assemblies may be applied/coated to a variety of solid substrates by methods such as roller coating, flow coating, dip coating, spin coating, spray coating knife coating, and die coating. These various methods of coating allow the pressure sensitive adhesive assemblies to be placed on the substrate at variable thicknesses thus allowing a wider range of use of the assemblies.

The substrate to which the pressure sensitive adhesive assembly may be applied is selected depending on the particular application. For example, the pressure sensitive adhesive assembly, in particular via its second and/or third pressure sensitive adhesive layer may be applied to sheeting products (e.g., decorative graphics and reflective products), label stock, and tape backings. Additionally, the pressure sensitive adhesive assembly may be applied directly onto other substrates such as a metal panel (e.g., automotive panel) or a glass window so that yet another substrate or object can be attached to the panel or window. Accordingly, the pressure sensitive adhesive assembly of the present disclosure may find a particular use in the automotive manufacturing industry (e.g. for attachment of exterior trim parts or for weatherstrips), in the construction industry or in the solar panel construction industry.

As such, the pressure sensitive adhesive foams according to the present disclosure are particularly suited for (industrial) interior applications, more in particular for construction market applications, automotive applications or electronic applications. In the context of automotive applications, the pressure sensitive adhesive foams as described herein may find particular use for adhering e.g. automotive body side mouldings, weather strips or rearview mirrors.

Accordingly, the present disclosure is further directed to the use of a pressure sensitive adhesive foam or a pressure sensitive adhesive assembly as described above for industrial applications, preferably for interior (industrial) applications, more preferably for construction market applications, automotive applications or electronic applications.

In some aspects, the pressure sensitive adhesive assembly according to the present disclosure may be particularly useful for forming strong adhesive bonds to low surface energy (LSE) substrates. Included among such materials are polypropylene, polyethylene (e.g., high density polyethylene or HDPE), blends of polypropylene (e.g. PP/EPDM, TPO). Other substrates may also have properties of low surface energy due to a residue, such as an oil residue or a film, such as paint, being on the surface of the substrate.

However, even though the pressure sensitive adhesive assemblies, may, in some aspects, bond well to low surface energy surfaces, the use of these adhesives is not limited to low surface energy substrates. The pressure sensitive adhesives assemblies may, in some aspects, surprisingly bond well to medium surface energy (MSE) substrates such as, for example, polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

Accordingly, the present disclosure is further directed to the use of a pressure sensitive adhesive foam or a pressure sensitive adhesive assembly as above described for the bonding to a low surface energy substrate and/or a medium surface energy substrate.

The pressure sensitive adhesive assembly may also be provided in the form of a pressure-sensitive adhesive transfer tape in which at least one layer of the pressure sensitive adhesive assembly is disposed on a release liner for application to a permanent substrate at a later time. The pressure sensitive adhesive assembly may also be provided as a single coated or double coated tape in which the pressure sensitive adhesive assembly is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Polymeric foams are commercially available from various suppliers such as 3M Co., Voltek, Sekisui, and others. The polymeric foam layer may be formed as a coextruded sheet with the pressure sensitive adhesive assembly on one or both sides of the polymeric foam layer, or the pressure sensitive adhesive assembly may be laminated to it. When the pressure sensitive adhesive assembly is laminated to the substrate, it may be desirable to treat the surface of the substrate to improve the adhesion. Such treatments are typically selected based on the nature of the materials in the pressure sensitive adhesive assembly and of the substrate and include primers and surface modifications (e.g., corona treatment and surface abrasion).

For a single-sided tape, the pressure sensitive adhesive assembly is applied to one surface of the backing material and a suitable release material is applied to the opposite surface of the backing material. Release materials are known and include materials such as, for example, silicones, polyolefins, polycarbamates, polyacrylics, and the like. For double coated tapes, the pressure sensitive adhesive assembly is applied to one surface of the backing material and a pressure sensitive adhesive assembly is disposed on the opposite surface of the backing material. Double coated tapes are often carried on a release liner.

Item 1 is a pressure sensitive adhesive foam comprising a rubber-based elastomeric material, at least one hydrocarbon tackifier and a crosslinking additive selected from the group of multifunctional (meth)acrylate compounds.

Item 2 is the pressure sensitive adhesive foam of item 1, which further comprises a filler material which is selected from the group consisting of microspheres, expandable microspheres, preferably pentane filled expandable microspheres, gaseous cavities, glass beads, glass microspheres, glass bubbles and any combinations or mixtures thereof.

Item 3 is a pressure sensitive adhesive foam according to any of item 1 or 2, wherein the at least one filler material is selected from the group consisting of expandable microspheres, glass bubbles, and any combinations or mixtures thereof.

Item 4 is a pressure sensitive adhesive foam according to any of the preceding items, wherein the multifunctional (meth)acrylate compound comprises at least two (meth)

acryloyl groups, in particular three or four (meth)acryloyl groups, more in particular three (meth)acryloyl groups.

Item 5 is a pressure sensitive adhesive foam according to any of the preceding items, wherein the multifunctional (meth)acrylate compound has the following Formula:

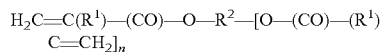

wherein $R^1$ is hydrogen or methyl; n is 1, 2, 3 or 4; and $R^2$ is an alkylene, arylene, heteroalkylene, or any combinations thereof.

Item 6 is a pressure sensitive adhesive foam according to any of the preceding items, wherein the multifunctional (meth)acrylate is selected from the group consisting of 1,6-hexanediol di(meth)acrylate, trimethylolpropane tri(meth)acrylate, and any combinations or mixtures thereof.

Item 7 is a pressure sensitive adhesive foam according to any of the preceding items, which is crosslinked, preferably with actinic radiation, more preferably with e-beam irradiation.

Item 8 is a pressure sensitive adhesive foam according to item 7, which is crosslinked with e-beam irradiation, and wherein the e-beam irradiation dose is of less than 150 kGy, less than 130 kGy, less than 100 kGy, less than 80 kGy, less than 50 kGy, or even less than 30 kGy.

Item 9 is a pressure sensitive adhesive foam according to any of item 7 or 8, wherein the e-beam irradiation dose is of at least 5 kGy, at least 10 kGy, or even at least 20 kGy.

Item 10 is a pressure sensitive adhesive foam according to any of the preceding items, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

Item 11 is a pressure sensitive adhesive foam according to any of the preceding items, wherein the rubber-based elastomeric material is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

Item 12 is a pressure sensitive adhesive foam according to any of the preceding items, wherein the rubber-based elastomeric material is selected from the group consisting of halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers; styrene-isoprene-styrene block copolymers; styrene-butadiene-styrene block copolymers, and any combinations or mixtures thereof.

Item 13 is a pressure sensitive adhesive foam according to any of the preceding items, wherein the rubber-based elastomeric material is selected from the group consisting of halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers, and any combinations or mixtures thereof.

Item 14 is a pressure sensitive adhesive foam according to any of the preceding items, wherein the hydrocarbon tackifier is selected from the group consisting of aliphatic hydrocarbon resins, cycloaliphatic hydrocarbon resins, aromatic modified aliphatic and cycloaliphatic resins, aromatic resins, hydrogenated hydrocarbon resins, terpene and modified terpene resins, terpene-phenol resins, rosin esters, and any combinations or mixtures thereof.

Item 15 is a pressure sensitive adhesive foam according to any of the preceding items, wherein the hydrocarbon tackifier comprises a mixture of a hydrocarbon tackifier which is liquid at room temperature and a hydrocarbon tackifier which is solid at room temperature.

Item 16 is a pressure sensitive adhesive foam according to any of the preceding items, which further comprises a plasticizer, which is preferably selected from the group consisting of polyisobutylenes, mineral oils, ethylene propylene diene monomer rubbers, liquid hydrocarbon resins, and any combinations or mixtures thereof.

Item 17 is a pressure sensitive adhesive foam according to any of the preceding items, which further comprises a plasticizer selected from the group of polyisobutylene plasticizers.

Item 18 is a pressure sensitive adhesive foam according to any of the preceding items, wherein the hydrocarbon tackifier(s) and/or the plasticizer(s), in particular the polyisobutylene plasticizer(s), have a Volatile Organic Compound (VOC) value of less than 1000 ppm, less than 800 ppm, less than 600 ppm, less than 400 ppm or even less than 200 ppm, when measured by thermogravimetric analysis according to the weight loss test method described in the experimental section.

Item 19 is a pressure sensitive adhesive foam according to any of the preceding items, wherein the hydrocarbon tackifier(s) and/or the plasticizer(s), in particular the polyisobutylene plasticizer(s), have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

Item 20 is a pressure sensitive adhesive foam according to any of the preceding items, wherein the hydrocarbon tackifier(s) and/or the plasticizer(s), in particular the polyisobutylene plasticizer(s), have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

Item 21 is a pressure sensitive adhesive foam according to any of the preceding items, which comprises:
a) from 20 wt % to 80 wt %, from 30 wt % to 70 wt %, or even from 40 wt % to 60 wt % of the rubber-based elastomeric material, based on the weight of the pressure sensitive adhesive foam;
b) from 5 wt % to 60 wt %, from 5 wt % to 50 wt %, from 10 wt % to 45 wt %, or even from 15 wt % to 45 wt % of the hydrocarbon tackifier(s), based on the weight of the pressure sensitive adhesive foam;
c) from 0.1 wt % to 10 wt %, from 0.5 wt % to 8 wt %, from 1 wt % to 6 wt %, or even from 2 wt % to 5 wt % of a crosslinking additive, based on the weight of the pressure sensitive adhesive foam, and wherein the crosslinking additive is selected from the group of multifunctional (meth)acrylate compounds;
d) optionally, from 1 wt % to 40 wt %, from 2 wt % to 30 wt %, from 5 wt % to 30 wt %, or even from 10 wt % to 25 wt % of the polyisobutylene plasticizer(s), based on the weight of the pressure sensitive adhesive foam; and
e) optionally, from 2 wt % to 30 wt %, from 2 wt % to 20 wt %, or even from 2 wt % to 15 wt % of filler material preferably selected from the group of expandable microspheres and glassbubbles, based on the weight of the pressure sensitive adhesive foam;
f) optionally, from 0.05 wt % to 2 wt % of stabilizers selected of the group consisting of thermal stabilizers, UV stabilizers and process stabilizers, based on the weight of the pressure sensitive adhesive foam; and
g) optionally, from 0.1 wt % to 5 wt % of filler additives preferably selected from the group consisting of carbon black, aerosil and silicates, based on the weight of the pressure sensitive adhesive foam.

Item 22 is a pressure sensitive adhesive assembly comprising a pressure sensitive adhesive foam according to any of the preceding items.

Item 23 is a pressure sensitive adhesive assembly according to item 22, wherein the pressure sensitive adhesive foam takes the form of a polymeric foam layer.

Item 24 is a pressure sensitive adhesive assembly according to item 23, which is in the form of a multilayer pressure sensitive adhesive assembly further comprising a second pressure sensitive adhesive layer adjacent to the pressure sensitive adhesive foam layer.

Item 25 is a pressure sensitive adhesive assembly according to item 24, which is in the form of a skin/core multilayer pressure sensitive adhesive assembly, wherein the pressure sensitive adhesive foam layer is the core layer of the multilayer pressure sensitive adhesive assembly and the second pressure sensitive adhesive layer is the skin layer of the multilayer pressure sensitive adhesive assembly.

Item 26 is a pressure sensitive adhesive assembly according to any of item 24 or 25, which is in the form of a multilayer pressure sensitive adhesive assembly further comprising a third pressure sensitive adhesive layer which is preferably adjacent to the pressure sensitive adhesive foam layer in the side of the pressure sensitive adhesive foam layer which is opposed to the side of the pressure sensitive adhesive foam layer adjacent to the second pressure sensitive adhesive layer.

Item 27 is a pressure sensitive adhesive assembly according to item 26, which is in the form of a skin/core/skin multilayer pressure sensitive adhesive assembly, wherein the pressure sensitive adhesive foam layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

Item 28 is a pressure sensitive adhesive assembly according to any of items 22 to 27, wherein a primer layer is comprised between the pressure sensitive adhesive foam layer and the second pressure sensitive adhesive layer and/or the third pressure sensitive adhesive layer.

Item 29 is a pressure sensitive adhesive assembly according to item 28, wherein the primer layer is crosslinkable, preferably with actinic radiation, more preferably with e-beam irradiation.

Item 30 is a pressure sensitive adhesive assembly according to item 29, wherein the primer layer comprises a crosslinking additive, which is preferably activated with actinic radiation, more preferably with e-beam irradiation.

Item 31 is a pressure sensitive adhesive assembly according to item 30, wherein the primer layer comprises a crosslinking additive selected from the group of multifunctional (meth)acrylate compounds, wherein the multifunctional (meth)acrylate compound preferably comprises at least two (meth)acryloyl groups, in particular three or four (meth)acryloyl groups, more in particular three (meth)acryloyl groups.

Item 32 is a pressure sensitive adhesive assembly according to any of items 22 to 31, which is crosslinked, preferably with actinic radiation, more preferably with e-beam irradiation.

Item 33 is a pressure sensitive adhesive assembly according to item 32, which is crosslinked with e-beam irradiation, and wherein the e-beam irradiation dose is preferably of less than 150 kGy, less than 130 kGy, less than 100 kGy, less than 80 kGy, less than 50 kGy, or even less than 30 kGy.

Item 34 is a pressure sensitive adhesive assembly according to item 33, wherein the e-beam irradiation dose is of at least 5 kGy, at least 10 kGy, or even at least 20 kGy.

Item 35 is a pressure sensitive adhesive assembly according to any of items 22 to 34, wherein the second pressure sensitive adhesive layer and/or the third pressure sensitive adhesive layer comprises a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

Item 36 is a pressure sensitive adhesive assembly according to item 35, wherein the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 30, from 1 to 20, or even from 1 to 15 carbon atoms.

Item 37 is a pressure sensitive adhesive assembly according to item 35 or 36, wherein the second pressure sensitive adhesive layer and/or the third pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

Item 38 is a pressure sensitive adhesive assembly according to item 37, wherein the linear or branched alkyl (meth) acrylate ester is selected from the group consisting of iso-octyl (meth)acrylate, 2-ethylhexyl (meth)acrylate, 2-propylheptyl (meth)acrylate, butyl acrylate, and any combinations or mixtures thereof; more preferably from the group consisting of iso-octyl acrylate, 2-ethylhexyl acrylate and 2-propylheptyl (meth)acrylate.

Item 39 is a pressure sensitive adhesive foam according to any of items 1 to 21 or a pressure sensitive adhesive assembly according to any of items 22 to 38, which has a static shear strength value of more than 2000 min, more than 4000 min, more than 6000 min, more than 8000 min, or even more than 10000 min, when measured at 70° C. according to the static shear test method described in the experimental section.

Item 40 is a pressure sensitive adhesive foam or a pressure sensitive adhesive assembly according to any of the preceding items, which has a Volatile Organic Compound (VOC) value of less than 2000 ppm, less than 1500 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

Item 41 is a pressure sensitive adhesive foam or a pressure sensitive adhesive assembly according to any of the preceding items, which has a Volatile Organic Compound (VOC) value of less than 2000 ppm, less than 1500 ppm, less than 1000 ppm, less than 800 ppm, less than 600 ppm, less than 500 ppm, less than 400 ppm, or even less than 300 ppm, when measured by thermal desorption analysis according to test method VDA278.

Item 42 is a pressure sensitive adhesive foam or a pressure sensitive adhesive assembly according to any of the preceding items, which has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermogravimetric analysis according to the weight loss test method described in the experimental section.

Item 43 is a pressure sensitive adhesive foam or a pressure sensitive adhesive assembly according to any of the preceding items, which has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

Item 44 is a method of manufacturing a pressure sensitive adhesive foam according to any of items 1 to 21, which comprises the steps of:
 a) compounding a rubber-based elastomeric material; at least one hydrocarbon tackifier; a crosslinking additive selected from the group of multifunctional (meth)acrylate compounds; optionally, a filler material preferably selected from the group consisting of expandable microspheres, glassbubbles, gaseous cavities, and any combinations or mixtures thereof; optionally, at least one plasticizer, in particular a polyisobutylene plasticizer; thereby forming a pressure sensitive adhesive foam formulation; and b) optionally, crosslinking the pressure sensitive adhesive foam formulation, preferably with actinic radiation, more preferably with e-beam irradiation.

Item 45 is a method according to item 44 which is a solvent-free method.

Item 46 is a method according to any of item 44 or 45, which comprises a hotmelt processing step, preferably a continuous hotmelt mixing processing step, more preferably a hotmelt extrusion processing step, in particular a twin screw hotmelt extrusion processing step.

Item 47 is the use of a pressure sensitive adhesive foam or a pressure sensitive adhesive assembly according to any of items 1 to 43 for industrial applications, preferably for interior applications, more preferably for construction market applications, automotive applications or electronic applications.

EXAMPLES

The present disclosure is further illustrated by the following examples. These examples are merely for illustrative purposes only and are not meant to be limiting on the scope of the appended claims.

Test Methods and Procedures:
TGA Test Method

The TGA (Thermogravimetric Analysis) measurements are performed with a Q5000IR equipment from Texas Instruments. The samples are weighed in a platinum pan and placed with an auto sampler in the oven of the apparatus. The nitrogen flow through the oven is 25 mL/min, the nitrogen flow through the balance is 10 mL/min. The temperature is equilibrated at 30° C. and is held for 15 minutes. Then the temperature is increased to 90° C. with a ramp of 60° C./min. The 90° C. are then held for 30 minutes. In a next step, the temperature is increased to 120° C. with a ramp of 60° C./min. The 120° C. are held for 60 minutes. The weight losses during 30 minutes at 90° C. (VOC analysis) and during 60 minutes at 120° C. (FOG analysis) are recorded.

The test is then completed by increasing the temperature to 800° C. with a ramp of 10° C./min. Then, the temperature is equilibrated at 600° C., the oven is purged with air and the temperature is increased to 900° C. with a ramp of 10° C./min.

Oven Outgassing Test Method

A measure for the outgassing of raw material samples is accomplished by weighing 10 g of the selected raw material into an aluminum cup with a precision of 0.1 mg. Prior to this step, the aluminum cup is already weighed out with a precision in the same range of 0.1 mg. The weighed-in samples are then placed into a forced air oven for 2 hours at 160° C. Once the samples are removed from the oven, they are allowed to cool at ambient temperature (23° C.+/−2° C.) before weighing the filled aluminum cups again. The weight loss of the samples before and after oven drying is calculated and recorded in %.

Thermal Desorption Analysis of Organic Emissions According to VDA Test Method 278

VDA method 278 is a test method used for the determination of organic emissions from non-metallic trim components used to manufacture the interior of motor vehicles (VDA stands for "Verband der Automobilindustrie", the German Association of Automobilists). The method classifies the emitted organic compounds into two groups:

VOC value—the sum of volatile and semi-volatile compounds up to n-$C_{20}$ and
FOG value—the sum of the semi-volatile and heavy compounds from n-$C_{16}$ to n-$C_{32}$ For measuring the VOC and FOG values, adhesive samples of 30 mg+/−5 mg are weighed directly into empty glass sample tubes. The volatile and semi-volatile organic compounds are extracted from the samples into the gas stream and are then re-focused onto a secondary trap prior to injection into a GC for analysis. An automated thermal desorber (Markes International Ultra-UNITY system) is hereby used for the VDA 278 testing.

The test method comprises two extraction stages:
VOC analysis, which involves desorbing the sample at 90° C. for 30 minutes to extract VOC's up to n-$C_{20}$. This is followed by a semi-quantitative analysis of each compound as μg toluene equivalents per gram of sample.
FOG analysis, which involves desorbing the sample at 120° C. for 60 minutes to extract semi-volatile compounds ranging from n-$C_{16}$ to n-$C_{32}$. This is followed by semi-quantitative analysis of each compound as μg hexadecane equivalents per gram of sample.

The results expresses are the average of 3 measurements per sample. The VOC value is determined by two measurements. The higher value of the measurements is indicated as the result, as described in the VDA278 test method. To determine the FOG value, the second sample is retained in the desorption tube after the VOC analysis and reheated to 120° C. for 60 minutes.

90°-Peel-Test at 300 mm/min (According to FINAT Test Method No. 2, 8$^{th}$ Edition 2009)

Multilayer pressure sensitive adhesive assembly strips according to the present disclosure and having a width of 10 mm and a length>120 mm are cut out in the machine direction from the sample material. For test sample preparation the liner is first removed from the one adhesive side and placed on an aluminum strip having the following dimension 22×1.6 cm, 0.13 mm thickness. Then, the adhesive coated side of each PSA assembly strip is placed, after the liner is removed, with its adhesive side down on a clean test panel using light finger pressure. Next, the test samples are rolled twice with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell for 24 h at ambient room temperature (23° C.+/−2° C., 50% relative humidity+/−5%) prior to testing.

For peel testing the test samples are in a first step clamped in the lower movable jaw of a Zwick tensile tester (Model Z020 commercially available from Zwick/Roell GmbH, Ulm, Germany). The multilayer pressure sensitive adhesive film strips are folded back at an angle of 90° and their free ends grasped in the upper jaw of the tensile tester in a configuration commonly utilized for 90° measurements. The tensile tester is set at 300 mm per minute jaw separation rate. Test results are expressed in Newton per 10 mm (N/10 mm) The quoted peel values are the average of two 90°-peel measurements.

Static Shear-Test @ RT with 500 g (According to FINAT Test Method 8, 8$^{th}$ Edition 2009)

The test is carried out at ambient room temperature (23° C.+/−2° C. and 50%+/−5% relative humidity). Test specimen are cut out having a dimension of 12.7 mm by 25.4 mm. The liner is then removed from one side of the test specimen and the adhesive is adhered onto to an aluminum plate having the following dimension 25.4×50×1 mm thickness and comprising a hole for the weight. The second liner is thereafter removed from the test specimen and the small panel with the test specimen is applied onto the respective test panel (stainless steel) having the following dimensions: 50 mm×50 mm×2 mm at the short edge. Next, the test samples are rolled twice with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell for 24 h at ambient room temperature (23° C.+/−2° C., 50% relative humidity+/−5%) prior to testing.

Each sample is then placed into a vertical shear-stand (+2° disposition) with automatic time logging and a 500 g weight is then hung into the hole of the aluminum plate. The time until failure is measured and recorded in minutes. Target value is 10.000 minutes. Per test specimen two samples are measured. A recorded time of "10000+" indicates that the adhesive does not fail after 10000 min.

Static Shear Test @ 70° C. With 500 g (FINAT Test Method No. 8, 8$^{th}$ Edition 2009)

The test is carried out at 70° C. Test specimen are cut out having a dimension of 12.7 mm by 25.4 mm. The liner is then removed from one side of the test specimen and the adhesive is adhered onto an aluminum plate having the following dimension 25.4×50×1 mm thickness and comprising a hole for the weight. The second liner is thereafter removed from the test specimen and the small panel with the test specimen is applied onto the respective test panel (stainless steel) having the following dimensions: 50 mm×50 mm×2 mm at the short edge.

Next, the test samples are rolled twice with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell for 24 h at ambient room temperature (23° C.+/−2° C., 50% relative humidity +/−5%) prior to testing.

Each sample is then placed into a vertical shear-stand (+2° disposition) at 70° C. with automatic time logging. After 10 minutes dwell time in the oven, a 500 g weight is hung into the hole of the aluminum plate. The time until failure is measured and recorded in minutes. Target value is 10.000 minutes. Per test specimen two samples are measured. A recorded time of "10000+" indicates that the adhesive does not fail after 10000 min.

Failure modes are given as follows:
FS ("foam split") indicates cohesive failure of foam core);
2B ("2-bond") indicates delamination of skin and foam core, respective failure between skin/primer or primer/core).
Raw Materials Used:
The raw materials and commercial adhesive tapes used are summarized below in Table 1.

TABLE 1

Raw material list.

| Name | Description | Supplier |
|---|---|---|
| 468MP | Acrylic adhesive transfer tape 130 μm thick | 3M |
| Primer 94 (P94) | Solvent based Primer | 3M |
| Trapylen5650 | Modified chlorinated polyolefin dissolved in Isobornyl acrylate (IBOA) | Tramaco |
| SR350 | Trimethylolpropane trimethacrylate (TMPTMA) | Sartomer |
| SR351 | Trimethylolpropane triacrylate (TMPTA) | Sartomer |
| SR506D | Isobornylacrylate (IBOA) | Sartomer |
| SR238 | 1,6-Hexanediol diacrylate (HDDA) | Sartomer |
| TAIC | Triallyl isocyanurate | Sigma Aldrich |
| Ricon 154 | High vinyl polybutadiene | Cray Valley |
| Bromobutyl Rubber 2030 (BB2030) | Bromobutyl rubber with a Mooney Viscosity ML (1 + 8) 125° C. of 32 MU | Lanxess |
| Bromobutyl Rubber X2 (BBX2) | Bromobutyl rubber with a Mooney Viscosity ML (1 + 8) 125° C. of 46 MU | Lanxess |
| Infuse 9807 | Ethylene/octene block copolymer | DOW |
| Vestoplast751 (V751) | Amorphous polyalphaolefin (ethen-propene-butene copolymer) with a softening point of 99° C. | Evonik |
| Regalite R9100 | Partially hydrogenated hydrocarbon resin | Eastman |
| Regalite R1090 | Hydrogenated hydrocarbon resin | Eastman |
| Piccotac 1020E | Liquid aliphatic hydrocarbon resin | Eastman |
| Plastolyn R1140 | Hydrogenated hydrocarbon resin | Eastman |
| Escorez 1304 | Aliphatic hydrocarbon resin | ExxonMobil |
| Escorez 5615 | Aliphatic/aromatic hydrocarbon resin | ExxonMobil |
| Escorez 5320 | Hydrogenated cycloaliphatic hydrocarbon resin | ExxonMobil |
| Escorez 5340 | Hydrogenated cycloaliphatic hydrocarbon resin | ExxonMobil |
| Oppanol B10N | Polyisobutylene of MW = 36000 g/mol | BASF |
| Oppanol B12N | Polyisobutylene of MW = 51000 g/mol | BASF |
| Oppanol B15N | Polyisobutylene of MW = 75000 g/mol | BASF |
| Glass bubbles K37 | Glass bubbles | 3M |
| ACX 7065 | Tackified acrylic foam tape 1200 μm thick | TESA |
| ACX 7078 | Acrylic foam 2000 μm thick | TESA |

Adhesive Compounding and Sample Preparation:

Adhesive Foam Preparation

The pressure-sensitive adhesive foams comprising olefinic based block copolymers as rubber-based elastomeric material, are made in a hot melt process using a Brabender Plastograph kneader (commercially available by Brabender GmbH, Duisburg, Germany) with a kneading volume of 370 cm³. Pressure-sensitive adhesive foams based on bromobutyl rubber are hot melt compounded in a Haake Polylab OS kneader with a kneading volume of 250 cm³.

In a first step, the selected rubber-based elastomeric material, the hydrocarbon tackifier resin(s) and optionally the plasticizer(s) are carefully added under constant kneading at a rate of 30 rpm. For addition of bromo-butyl rubber, 3×3 cm pieces are cut from the rubber blocks and pre-heated in a forced air oven to 60° C. before placing the blocks into the kneader.

In a second step, K37 glass bubbles are added and the mixture is mixed until a homogeneous mass is obtained. In a final step, a given amount of a crosslinker is added and kneaded until the mixture is homogeneous. Then, the mass is dumped.

In a 50 kN heat press (commercially available from Rucks Maschienenbau GmbH, Glauchau, Germany) operated at 120° C., the foam mass is then placed between two siliconized paper release liners and pressed to a sheet of 1.2 mm thickness.

E-Beaming of Pressure-Sensitive Adhesive Foams

The foam sheets are then e-beamed using 80-300 kV e-beam equipment commercially available from Electron Crosslinking AB (Nehren, Germany). Prior to e-beaming, the top liners are removed. The foam sheets are then irradiated from both sides with an e-beam. In case of the olefinic block copolymer based foams, an acceleration tension of 265 kV is used, providing the best ionization profile for 860 to 900 g/m² foam sheets. These foam sheets are irradiated with a 100 kGy dose from each side. The nitrogen gap is adjusted to 30 mm.

For bromobutyl-rubber based foams, an acceleration tension of 295 kV is used, providing the best ionization profile for 1056 g/m³ foam sheets. These foam sheets are irradiated using low doses of 10, 20 and 30 kGy from each side. Here also, the nitrogen gap is adjusted to 30 mm.

Manufacturing of Pressure Sensitive Adhesive Assemblies

For providing pressure-sensitive adhesive assemblies according to the invention, the e-beamed foam sheets are primered with either a thin layer of Primer 94 (commercially available by 3M Deutschland GmbH, Germany) or an e-beam curable primer. When using the solvent-based primer P94, a layer of acrylic transfer adhesive 468 MP is laminated at room temperature (23° C.+/−2° C.) onto the foam sheets after the solvent is evaporated. This operation is repeated for the second side of the foam core, when skin/core/skin constructions are desired.

When using the e-beam curable primer, the reactive primer solution is coated onto the foam cores with a 10 μm spiral applicator from Erichsen. The pressure-sensitive adhesive assembly samples are then exposed to e-beam irradiation that simultaneously crosslinks the foam construction and cures the primer layer. This leads also to a very good adhesion of the primer layer to the foam core.

The e-beam curable primer (or reactive primer) which is used herein comprises modified chlorinated polyolefins dissolved in a reactive acrylate monomer (Isobornyl acrylate), which are compounded with a trifunctional acrylate (SR351) serving as a crosslinker when exposed to e-beam irradiation. The primer composition is described below in Table 2.

TABLE 2

Chemical composition of the e-beam curable primer.

|  | E-beam curable primer |
| --- | --- |
| Trapylen 5650 | 50 |
| SR351 | 50 |

Exemplary Preparation of the Pressure-Sensitive Adhesive Assemblies

In a first step, foam cores are produced as previously described. A total of 14 different foam cores (E1-E14) and one comparative foam core (C1) are produced. Acrylic transfer tapes are then laminated to these foam cores providing the skin/core/skin pressure-sensitive adhesive assemblies useful for static shear and peel testing.

The compositions of the selected foam cores are listed below in Tables 3 and 4. Table 3 discloses foam cores using bromo-butyl rubber (E1 to E5) as elastomeric material and a tri-functional methacrylate as crosslinking additive. Table 4 provides foam cores using olefinic block copolymers as elastomeric material and using different kinds of crosslinking additives.

TABLE 3

Chemical composition of bromo-butyl rubber based foam constructions E1 to E5.

|  | E1 | E2 | E3 | E4 | E5 |
| --- | --- | --- | --- | --- | --- |
| BBX2 | 60 | 60 | 60 | 60 | 60 |
| R9100 | 25 | 25 | 25 | 32.5 | 40 |
| P1020E | 15 | 15 | 15 | 7.5 | — |
| K37 | 12 | 12 | 12 | 12 | 12 |
| SR350 | 2.5 | 3.75 | 5 | 3.75 | 3.75 |

TABLE 4

Chemical composition of olefinic block copolymer based foam core constructions E6 to E14 with crosslinking additive and comparative foam core C1 without crosslinker.

|  | E6 | E7 | E8 | E9 | E10 | E11 | E12 | E13 | E14 | C1 |
| --- | --- | --- | --- | --- | --- | --- | --- | --- | --- | --- |
| Infuse 9807 | 50 | 50 | 50 | 50 | 50 | 50 | 50 | 50 | 50 | 50 |
| E1304 |  |  |  |  |  |  |  | 40 |  |  |
| E5615 | 35 | 35 | 35 | 35 | 35 | 35 | 35 |  | 30 | 35 |
| B12N | 15 | 15 | 15 | 15 | 15 | 15 | 15 | 10 | 20 | 15 |
| IBOA | 3.75 |  |  |  |  |  |  |  |  |  |
| HDDA |  | 3.75 |  |  |  |  |  |  |  |  |
| TAIC |  |  |  |  |  | 3.75 |  |  |  |  |
| Ricon 154 |  |  |  |  |  |  | 3.75 |  |  |  |
| SR350 |  |  |  |  |  |  |  | 3.75 | 3.75 |  |
| SR351 |  |  | 2.5 | 3.75 | 5 |  |  |  |  |  |
| K37 | 12 | 12 | 12 | 12 | 12 | 12 | 12 | 12 | 12 | 12 |

Table 5 provides an overview of the exemplary pressure-sensitive adhesive assemblies used for static shear and 90° peel testing. All pressure-sensitive adhesive assemblies use acrylic transfer tape 468MP as skin layer.

TABLE 5

Overview of the exemplary pressure-sensitive adhesive assemblies used for static shear and 90° peel testing.

| Example No | Foam core used | e-beam radiation dose (kGy) | Primer used for skin layer lamination |
| --- | --- | --- | --- |
| Ex. 1a | E1 | 0 | P94 |
| Ex. 1b | E1 | 10 | P94 |
| Ex. 1c | E1 | 20 | P94 |
| Ex. 1d | E1 | 30 | P94 |
| Ex. 2a | E2 | 0 | P94 |
| Ex. 2b | E2 | 10 | P94 |
| Ex. 2c | E2 | 20 | P94 |
| Ex. 2d | E2 | 30 | P94 |
| Ex. 3a | E3 | 0 | P94 |
| Ex. 3b | E3 | 10 | P94 |
| Ex. 3c | E3 | 20 | P94 |
| Ex. 3d | E3 | 30 | P94 |
| Ex. 4a | E4 | 0 | P94 |
| Ex. 4b | E4 | 10 | P94 |
| Ex. 4c | E4 | 20 | P94 |
| Ex. 4d | E4 | 30 | P94 |
| Ex. 5a | E5 | 0 | P94 |
| Ex. 5b | E5 | 10 | P94 |
| Ex. 5c | E5 | 30 | P94 |
| Ex. 6a | E6 | 100 | P94 |
| Ex. 6b | E6 | 100 | e-beam curable primer |
| Ex. 7a | E7 | 100 | P94 |
| Ex. 7b | E7 | 100 | e-beam curable primer |
| Ex. 8a | E8 | 100 | P94 |
| Ex. 8b | E8 | 100 | e-beam curable primer |
| Ex. 9a | E9 | 100 | P94 |
| Ex. 9b | E9 | 100 | e-beam curable primer |
| Ex. 10a | E10 | 100 | P94 |
| Ex. 10b | E10 | 100 | e-beam curable primer |
| Ex. 11a | E11 | 100 | P94 |
| Ex. 11b | E11 | 100 | e-beam curable primer |

TABLE 5-continued

Overview of the exemplary pressure-sensitive adhesive assemblies used for static shear and 90° peel testing.

| Example No | Foam core used | e-beam radiation dose (kGy) | Primer used for skin layer lamination |
|---|---|---|---|
| Ex. 12a | E12 | 100 | P94 |
| Ex. 12b | E12 | 100 | e-beam curable primer |
| Ex. 13a | E13 | 100 | P94 |
| Ex. 13b | E13 | 100 | e-beam curable primer |
| Ex. 14a | E14 | 100 | P94 |
| Ex. 14b | E14 | 100 | e-beam curable primer |
| Comp. Ex. 1a | C1 | 100 | P94 |
| Comp. Ex. 1b | C1 | 100 | e-beam curable primer |

Test Results:

TGA Test Results

Thermogravimetric analysis (TGA) are performed on several foam raw materials and commercially available foams. The results are described in Table 6.

TABLE 6

TGA results of selected foam raw materials and foam cores.

| | Weight loss 30 min 90° C. (in ppm) - VOC analysis | Weight loss 60 min 120° C. (in ppm) - FOG analysis |
|---|---|---|
| ACX 7065 | 1984 | 5653 |
| ACX 7078 | 1528 | 2342 |
| Infuse9807 | 384 | 384 |
| V751 | 737 | 1408 |
| Kraton D1340 | 326 | 234 |
| Regalite R9100 | 1195 | 9968 |
| Regalite R1090 | 2086 | 20441 |
| Escorez 5615 | 150 | 599 |
| Escorez 1304 | 341 | 1366 |
| Escorez 5340 | 359 | 559 |
| Escorez 5320 | 334 | 1077 |
| Plastolyn R1140 | 333 | 534 |
| Oppanol B10N | 611 | 1901 |
| Oppanol B12N | 261 | 521 |

Oven Outgassing Results

The oven outgassing tests enable on a laboratory scale a quick evaluation, if a selected foam raw material will contribute towards obtaining a low VOC pressure-sensitive adhesive foam. Results of this test are shown in Table 7 and recorded as % weight loss.

TABLE 7

Oven outgassing values of selected foam raw materials.

| Sample | weight loss 2 h 160° C. (%) |
|---|---|
| Infuse 9807 | 0.11 |
| R9100 | 2.53 |
| R1090 | 4.99 |
| E5615 | 0.21 |
| E1304 | 0.52 |
| P1020E | 1.12 |
| B10N | 0.22 |
| B12N | 0.07 |

The tackifier resins Escorez 5615 (E5615) and Escorez 1304 (E1304) show very good thermal stability at 160° C. On the contrary Regalite 9100 (R9100) has a big weight loss at 160° C. Hereby the weight loss at 160° C. gives a good indication of the thermal stability of a raw material and its behavior when processed at high temperatures in e.g. a hot melt process.

VDA 278 Test Results

Measurements according to VDA 278 are performed for some foam core sheets, in order to determine VOC and FOG values. The results are described in Table 8.

TABLE 8

VDA 278 test results for selected materials.

| Sample | Chemistry | VOC level (ppm) | FOG level (ppm) |
|---|---|---|---|
| E13 | olefinic block copolymer | 140 | 202 |
| E14 | olefinic block copolymer | 95 | 133 |

Foam cores made with a low outgassing hydrocarbon tackifier, low outgassing plasticizer and multifunctional crosslinking additive (SR 350), show very low VOC values (below 500 ppm).

90° Peel and Static Shear (SS) Test Results at Room Temperature (RT) and at 70° C.

90° Peel test results and Static Shear test results at RT and at 70° C. of the examples are shown in Table 9.

TABLE 9

90°Peel and Static Shear at RT and at 70° C. test results.

| Example No | 90° Peel to steel (N/cm) | Static Shear at RT (min) | Static Shear at 70° C. (min) | Failure Mode |
|---|---|---|---|---|
| Ex. 1c | 40.4 | >10000 | 4017 | 2B |
| Ex. 2b | 30.4 | >10000 | 6646 | 2B |
| Ex. 2c | 33.2 | >10000 | >10000 | |
| Ex. 2d | 33.8 | >10000 | 6130 | 2B |
| Ex. 3b | 25.5 | >10000 | >10000 | |
| Ex. 3c | 30.6 | >10000 | >10000 | |
| Ex. 3d | 28.6 | >10000 | 5890 | 2B |
| Ex. 4b | 27.5 | >10000 | >10000 | |
| Ex. 4c | 27.1 | >10000 | >10000 | |
| Ex. 5c | 27.8 | >10000 | 6400 | 2B |
| Ex. 6a | 65.9 | >10000 | — | |
| Ex. 6b | — | — | 38 | FS |
| Ex. 7a | 36.9 | >10000 | — | |
| Ex. 7b | — | — | >10000 | |
| Ex. 8a | 26.8 | >10000 | — | |
| Ex. 8b | — | — | >10000 | |
| Ex. 9a | 33.4 | >10000 | — | |
| Ex. 9b | — | — | >10000 | |
| Ex. 10a | 24.5 | >10000 | — | |
| Ex. 10b | — | — | >10000 | |
| Ex. 11a | 36.0 | >10000 | — | |
| Ex. 11b | — | — | 228 | FS |
| Ex. 12a | 38.4 | — | — | |
| Ex. 12b | — | — | 34 | FS |
| Ex. 13a | 61.8 | >10000 | — | |
| Ex. 13b | — | — | >10000 | |
| Ex. 14a | 39.9 | >10000 | — | |
| Ex. 14b | — | — | >10000 | |
| Comp. Ex. 1a | 62.2 | >10000 | — | |
| Comp. Ex. 1b | — | — | 61 | FS |

FS denotes foam split (cohesive failure) and 2B denotes two-bond (delamination of skin and core).

As can be seen from the results summarized in Table 9, pressure-sensitive adhesive assemblies not according to the present invention (Examples 6, 11, 12 and Comp. Ex. 1), i.e. which do not use a multifunctional (meth)acrylate compound as crosslinking additive, provide poor static shear performance at elevated temperature (70° C.) when compared to pressure-sensitive adhesive assemblies according to the invention.

The invention claimed is:
1. A pressure sensitive assembly comprising:
1) a core layer comprising a pressure sensitive adhesive foam comprising
   a) from 30 wt % to 70 wt % of a rubber-based elastomeric material,
   b) from 10 wt % to 45 wt % at least one hydrocarbon tackifier,
   c) from 0.1 wt % to 10 wt % of a crosslinking additive selected from the group of multifunctional (meth)acrylate compounds, and
   d) from 2 wt % to 30 wt % of a filler material selected from the group consisting of microspheres, expandable microspheres, gaseous cavities, glass beads, glass microspheres, glass bubbles and any combinations or mixtures thereof; and
   e) optionally, from 1 wt % to 40 wt % plasticizer selected from the group consisting of polyisobutylenes,
   wherein the hydrocarbon tackifier(s) and/or the plasticizer(s) have a Volatile Organic Compound (VOC) value of less than 1000 ppm, when measured by thermogravimetric analysis by measuring the weight loss during 30 minutes at 90° C; and
   wherein the pressure sensitive adhesive foam is crosslinked with the crosslinking additive and electron beam radiation; and
2) a first skin layer comprising a second pressure sensitive adhesive, wherein the first skin layer is not a foam.

2. A pressure sensitive adhesive assembly according to claim 1, wherein the multifunctional (meth)acrylate compound has the following Formula:

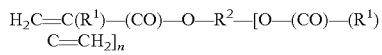

wherein $R^1$ is hydrogen or methyl; n is 1, 2, 3 or 4; and $R^2$ is an alkylene, arylene, heteroalkylene, or any combinations thereof.

3. A pressure sensitive adhesive assembly according to claim 1, wherein the multifunctional (meth)acrylate is selected from the group consisting of 1,6-hexanediol di(meth)acrylate, trimethylolpropane tri(meth)acrylate, and any combinations or mixtures thereof.

4. A pressure sensitive adhesive assembly according to claim 1, wherein the rubber-based elastomeric material is selected from the group consisting of halogenated butyl rubbers; halogenated isobutylene-isoprene copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

5. A pressure sensitive adhesive assembly according to claim 1, wherein the pressure sensitive adhesive foam comprises:
   a) from 40 wt % to 60 wt % of the rubber-based elastomeric material, based on the weight of the pressure sensitive adhesive foam;
   b) from 10 wt % to 45 wt % of the hydrocarbon tackifier(s), based on the weight of the pressure sensitive adhesive foam;
   c) from 1 wt % to 6 wt % of a crosslinking additive, based on the weight of the pressure sensitive adhesive foam, and wherein the crosslinking additive is selected from the group of multifunctional (meth)acrylate compounds;
   d) optionally, from 1 wt % to 40 wt %, of the polyisobutylene plasticizer(s), based on the weight of the pressure sensitive adhesive foam; and
   e) from 2 wt % to 30 wt % of filler material selected from the group of expandable microspheres and glass bubbles, based on the weight of the pressure sensitive adhesive foam;
   f) optionally, from 0.05 wt % to 2 wt % of stabilizers selected of the group consisting of thermal stabilizers, UV stabilizers and process stabilizers, based on the weight of the pressure sensitive adhesive foam; and
   g) optionally, from 0.1 wt % to 5 wt % of filler additives selected from the group consisting of carbon black, aerosil and silicates, based on the weight of the pressure sensitive adhesive foam,
   wherein the hydrocarbon tackifier(s) and/or the plasticizer(s) have a Volatile Organic Compound (VOC) value of less than 1000 ppm, when measured by thermogravimetric analysis by measuring the weight loss during 30 minutes at 90° C.

6. A pressure sensitive adhesive assembly according to claim 1, wherein second pressure sensitive adhesive comprises a polyacrylate.

7. A pressure sensitive adhesive assembly according to claim 6, wherein the multilayer pressure sensitive adhesive assembly further comprises a second skin layer comprising a third pressure sensitive adhesive comprising a polyacrylate.

8. A pressure sensitive adhesive assembly according to claim 1, wherein the rubber is a synthetic rubber.

9. A pressure sensitive adhesive assembly according to claim 8, wherein the rubber is selected from the group consisting of halogenated isobutylene-isoprene copolymers, olefinic block copolymers, styrene-isoprene-styrene block copolymers, styrene-butadiene-styrene block copolymers, and combinations or mixtures thereof.

* * * * *

UNITED STATES PATENT AND TRADEMARK OFFICE
CERTIFICATE OF CORRECTION

PATENT NO. : 10,106,708 B2  
APPLICATION NO. : 14/905524  
DATED : October 23, 2018  
INVENTOR(S) : Pierre Bieber et al.

Page 1 of 1

It is certified that error appears in the above-identified patent and that said Letters Patent is hereby corrected as shown below:

In the Specification

Column 15  
Line 35, delete "calorimetry" and insert -- Calorimetry --, therefor.  
Line 53, delete "isophoryl" and insert -- isopropyl --, therefor.

Column 20  
Line 23, delete "photoinitator" and insert -- photoinitiator --, therefor.

Column 29  
Line 2, delete "isophoryl" and insert -- isopropyl --, therefor.

Columns 33-34  
Line 18 (Table 1), delete "(ethen-" and insert -- (ethene- --, therefor.

Column 33  
Line 64 (approx.), delete "Maschienenbau" and insert -- Maschinenbau --, therefor.

Columns 35-36  
Line 13, delete "olefimc" and insert -- olefinic --, therefor.

In the Claims

Column 39  
Line 17, in Claim 1, delete "optionally, from" and insert -- from --, therefor.

Column 40  
Line 19 (approx.), in Claim 5, delete "optionally, from" and insert -- from --, therefor.

Signed and Sealed this  
Twenty-fifth Day of December, 2018

Andrei Iancu  
*Director of the United States Patent and Trademark Office*